April 12, 1949. C. R. LIVERMON 2,467,140
WHEEL STARTER FOR AIRCRAFT
Filed Feb. 18, 1946
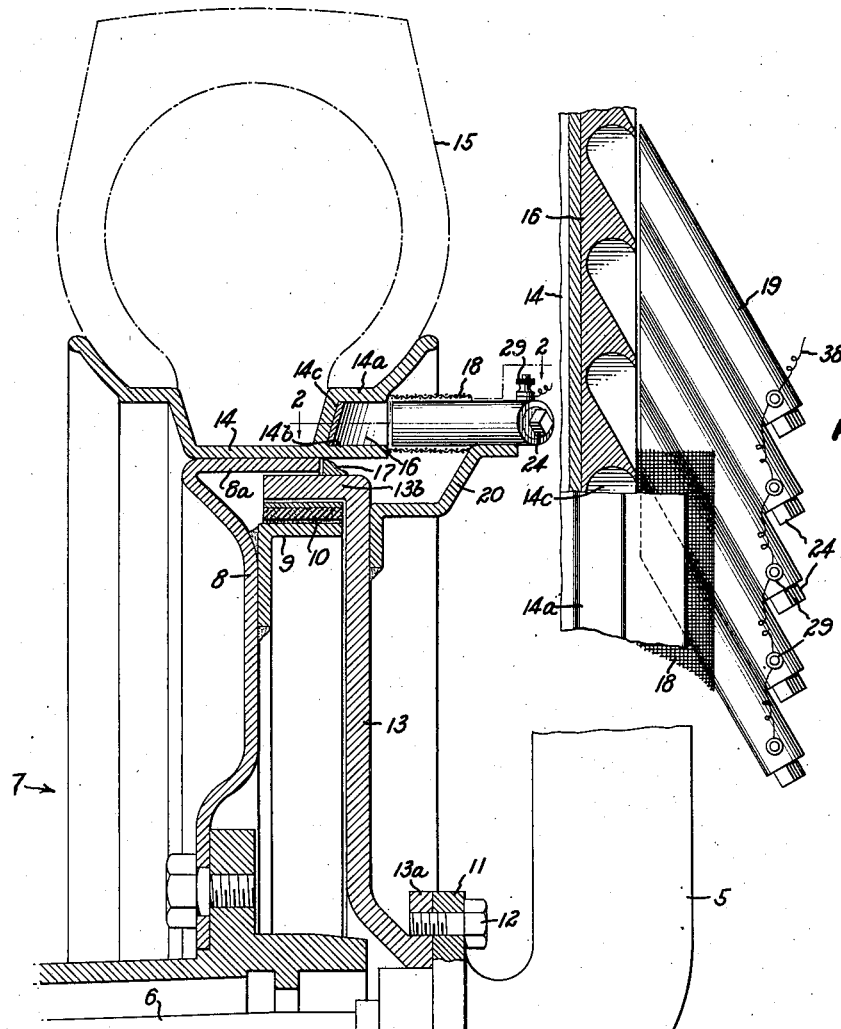
Inventor:
Carl R. Livermon,
By
Pierce & Scheffler,
Attorneys.

Patented Apr. 12, 1949

2,467,140

UNITED STATES PATENT OFFICE 2,467,140

WHEEL STARTER FOR AIRCRAFT

Carl R. Livermon, Roxobel, N. C.

Application February 18, 1946, Serial No. 648,340

2 Claims. (Cl. 244—103)

This invention relates to aircraft landing gear and more particularly to a wheel starter for setting a landing wheel in motion preparatory to landing an aircraft embodying the invention.

An object of the invention is to provide an improved wheel starter wherein use is made of an explosive substance to supply energy for spinning the wheel.

Another object is to provide a wheel starter of this character having means for minimizing access of power combustion products to the brake mechanism normally associated with the landing wheel with attendant damage to the brake mechanism.

A further object is to provide a greatly improved arrangement of brake housing and sealing means therefor, the brake housing serving as a base for the mounting of holders for the explosive material furnishing the necessary power for the wheel starter.

A further object is to provide a unique cartridge holder in which cartridges may be readily inserted and removed.

Still another object is to provide a simple and efficient breech block construction for the cartridge holder having a reliable and simple insulated electrical conductor for transmitting ignition current to the cartridge.

Still other objects and advantages of the invention will be in part apparent and in part pointed out in the following description when considered in connection with the accompanying drawing, wherein:

Fig. 1 is fragmentary sectional view of a landing wheel embodying the invention, with some parts shown in elevation;

Fig. 2 is a fragmentary developed view taken along the surface generated by revolving the line 2—2 of Fig. 1 about the axis of the wheel; and Fig. 3 is an enlarged sectional view of a cartridge holder showing a cartridge in the chamber.

The present invention is related to the invention of my U. S. Patent No. 2,461,288 of February 8, 1949, for "Aircraft landing gear," but, as will be apparent, presents distinct advantages thereover.

Referring particularly to the drawing, there is shown, in Fig. 1, an embodiment of the invention including a landing wheel strut 5 which, as will be understood, is attached in conventional manner to an airplane or other aircraft. On the wheel spindle 6 is rotatably mounted a landing wheel 7 having the usual hub, wheel disc, rim and tire. An outer portion of the wheel disc 8 is provided with a welded on brake drum 9. Cooperating with the brake drum is a complementary brake band or shoe 10 that is contracted by well known mechanism (not shown) to exert braking action on the wheel. The specific brake mechanism shown forms no part of the present invention, and any suitable braking device, such as one utilizing an internal expanding shoe, may be employed instead.

A cup shaped brake housing 13 is mounted on a flange 11 that is formed near the inner end of spindle 6, the housing being attached to the flange, as by means of bolts 12 extending through an annular neck portion 13a of the brake housing.

As is clear from Fig. 1, the extreme outer portion of wheel disc 8 is bent inwardly in an axial direction to form a short cylindrical portion 8a to which is rigidly secured the rim 14 and tire 15. Brake housing 13 is bent outwardly in an axial direction to form a short cylindrical portion 13b which terminates close to and within the cylindrical portion 8a of disc 8. Disc 8 and brake housing 13 are both imperforate and the two thus form a practically complete inclosure for the brake mechanism. It will, of course, be understood that no actual contact exists between the brake housing and the wheel, a small clearance (the annular space between cylindrical portions 8a and 13b) being provided to assure free rotation of the wheel.

A portion of rim 14 extends in an axial direction at 14a. Rim portion 14a together with an axially extending circular rim flange 14b form an annular recess 14c within which is secured a bladed turbine rotor 16. Alternatively the blades of the rotor may be made separately and then secured to the walls of recess 14c.

An annular rib 17 is fitted tightly onto the cylindrical portion 13b of the brake housing. Rib 17 lies closely adjacent to the end wall of the cylindrical portion 8a of the wheel disc and also closely adjacent the inner wall surface of flange 14b. Rib 17 operates in a manner to be more fully explained hereinafter, to provide an effective seal against ingress of powder gases to the brake mechanism.

A safety screen or spark arrester 18 is affixed over the exhaust openings of the turbine rotor for the purpose of decreasing fire hazard.

Power for driving the turbine rotor is supplied by cartridges contained in holders 19 carried by a generally cylindrical bracket 20 secured to the brake housing 13. Preferably the cartridge holders are arranged in uniformly spaced groups that each contain the same number of cartridge holders but this arrangement is not critical and the holders for the number of cartridges required may be individually spaced uniformly about the brake housing 13.

A detailed sectional view of one of the cartridge holders is shown in Fig. 3. The holder includes a tubular body 21, open at the front end 22 and closed at the rear end by a breech block 23 that is threaded into the body. The breech block has a square head 24 which may be engaged by a wrench or other suitable tool for removing and inserting the block. Whereas the rear portion of the block may be made of metal, the forward part 25 is made of an insulating material, such as a ceramic substance or synthetic plastic material, that is keyed to the rear portion of the block as shown. A conducting ring 26 is seated in a recess in the periphery of insulating portion of the block and a conductor 27 leads from the ring to a contact point 28 on the inner face of the breech block. It will be understood that the conducting ring must not make contact with the body portion 21, and, to this end, the ring and the insulating material in which it is embedded are spaced from the walls of the body. A terminal 29, bushed in an insulator 30, is mounted near the rear of the cartridge holder, the inner end of the terminal being located to make contact with ring 26 when the breech block is screwed home. Thus, an insulated electrical path is provided from terminal 29 to contact point 28 irrespective of the final angular position of the breech block when fully home.

The holder provides a chamber for the reception of a cartridge 31. The case 32 of the cartridge may be formed of brass, steel or other appropriate material, and it is tapered in a forward direction for easy insertion in and removal from the holder. The front end of the case is abruptly necked down at 33 to provide a reduced orifice or nozzle for exit of powder combustion products. A contact point 34, insulated from the base of the cartridge case, is positioned at the rear of the case and engages the complementary contact point 28 on the breech when the breech is closed. An insulated conductor 35 leads from contact point 34 to fuse element 36, which latter is electrically connected to the cartridge case. The cartridge holder is grounded at 37. It will thus be seen that an electric circuit may be established from a source of current (not shown), one side of which is grounded, through a lead wire 38, terminal 29, ring 26, conductor 27, complementary contact points 28 and 34, conductor 35, fuse element 36 and cartridge case 32 to the grounded cartridge holder body 21.

When such a circuit is established, the fuse element 36 will ignite a powder or other combustible charge 39 contained in the cartridge case. The burning of the powder produces a large volume of combustion products which issue from the front end of the cartridge as a high velocity stream which, by virtue of the positioning of the cartridge holder with respect to the turbine rotor, impinges upon the blades of the rotor to cause the latter to rotate.

From an inspection of Figs. 1 and 2, it will be seen that rib 17 effectively seals the annular space between the cylindrical portions 8a and 13b of the wheel disc 8 and brake housing 13 thus substantially preventing ingress of combustion gases from cartridges 31 to the brake mechanism.

As shown in Fig. 2, a group of five cartridge holders 19 are connected in parallel to the lead wire 38 of the ignition circuit and the five cartridges in the holders will, therefore, be fired simultaneously. It will be understood, however, that by means of suitable circuits, the cartridges may be fired singly or in any desired combination. For example, the cartridges may be so designed that sufficient power for spinning the landing wheel will be developed by firing only one cartridge of each group. Assuming groups of five cartridge holders each, as illustrated in Fig. 2, the starter may be wired to fire simultaneously a cartridge in each group of cartridges, and to leave four cartridges in each group in reserve for the subsequent firing of other sets of one cartridge per group.

From the foregoing description, it will be apparent that the invention provides a greatly improved landing gear employing a turbine driven by powder combustion products and embodying means for minimizing damage to the brake mechanism. Moreover, the invention provides an improved means for holding the powder or other suitable explosive substance in convenient relation to the turbine rotor.

I claim:

1. In an aircraft landing gear of the character described, in combination, a landing wheel having an imperforate section terminating in an axially extending cylindrical portion; a brake drum carried by said wheel inwardly of said cylindrical portion; a complementary brake element carried by a relatively fixed part of the aircraft; a brake housing carried by a relatively fixed part of the aircraft, said housing including an axial cylindrical portion surrounding said brake drum and complementary brake element and extending within and close to the cylindrical portion of said landing wheel; an annular rib on the cylindrical portion of said housing, said rib closely overlying the entrance to the annular space between the cylindrical portions of said wheel and housing to provide a close but free-running fit with the wheel; a bladed turbine rotor carried by said wheel on the housing side thereof, said rotor being positioned radially outwardly of said rib; and means for directing a stream of powder combustion products in driving relation to the blades of said rotor; said directing means being located on the same side of said wheel as said housing, whereby, owing to the closeness of the fit between said rib and said annular space, ingress of the combustion products to said housing is minimized.

2. A cartridge holder of the character described comprising, in combination, a tubular body providing a chamber for the reception of a cartridge including an electric firing device having a contact point in the base of the cartridge, the breech of said body being internally threaded; a breech block threaded into the breech of said body, the portion of said block adjacent to the chamber being formed of an insulating material; a conducting ring carried by said insulated portion of said block, said ring lying adjacent to said body; an insulated conductor leading from outside said body through the wall thereof and to said ring; and a conductor leading from said ring to the chamber face of said block for making contact with the contact point of a chambered cartridge.

CARL R. LIVERMON.

REFERENCES CITED

The following references are of record in the file of this patent:

UNITED STATES PATENTS

| Number | Name | Date |
| --- | --- | --- |
| 2,005,913 | Coffman | June 25, 1935 |
| 2,372,207 | Kendrick | Mar. 27, 1945 |
| 2,386,301 | Duke | Oct. 9, 1945 |
| 2,411,552 | New | Nov. 26, 1946 |